United States Patent [19]

Hirota

[11] Patent Number: 4,961,033
[45] Date of Patent: Oct. 2, 1990

[54] CURRENT LIMITER FOR AN ELECTRICAL ACTUATOR

[75] Inventor: Fumiaki Hirota, Toyota, Japan

[73] Assignee: Aisin Seiki Kabushiki Kaisha, Aichi, Japan

[21] Appl. No.: 288,889

[22] Filed: Dec. 23, 1988

[30] Foreign Application Priority Data

Dec. 25, 1987 [JP] Japan ............... 62-328714

[51] Int. Cl.⁵ .............................. H02P 7/00
[52] U.S. Cl. ................. 318/560; 318/434; 318/432; 180/79.1; 180/163
[58] Field of Search .......... 388/811, 818, 819, 903, 388/902, 934, 916, 910; 318/430–434, 599–632; 180/160–165

[56] References Cited

U.S. PATENT DOCUMENTS

| | | | |
|---|---|---|---|
| 4,182,979 | 1/1980 | Douglas et al. | 318/434 |
| 4,427,930 | 1/1984 | Berman et al. | 388/810 |
| 4,500,820 | 2/1985 | Noto et al. | 388/810 |
| 4,514,665 | 4/1985 | Melocik | 388/810 |
| 4,574,226 | 3/1986 | Binder | 318/434 X |
| 4,591,014 | 5/1986 | Yasuda | 318/434 X |
| 4,599,548 | 7/1986 | Schultz | 388/811 |
| 4,618,805 | 10/1986 | Hornung | 318/432 X |
| 4,735,271 | 4/1988 | Shimizu | 318/432 X |

Primary Examiner—William M. Shoop, Jr.
Assistant Examiner—Paul Ip
Attorney, Agent, or Firm—Sughrue, Mion, Zinn, Macpeak & Seas

[57] ABSTRACT

The current limiter for an electrical actuator includes a switch for selectively controlling the current supplied to the electrical actuator. A detector detects the current level flowing through the electrical actuator and an electronic controller adjusts the duty ratio for the switch in order to limit excessive current. The electronic controller includes a comparator for comparing the current through the electrical actuator with an upper threshold level and a lower threshold level. The duty ratio is decreased gradually if the current exceeds the upper threshold level and is gradually increased if the current is below the lower threshold level. The duty ratio is sustained if the current is a range between the upper and lower threshold levels.

4 Claims, 7 Drawing Sheets

CURRENT LIMITER FOR AN ELECTRICAL ACTUATOR

BACKGROUND OF THE INVENTION

This invention relates to a current limiter for an electrical actuator such as an electric motor, and more particularly relates to a control for energizing the electrical actuator at a moment when an excessive current is supplied to the electrical actuator.

A chopping control is a very common method in the art so as to adjust the torque generated by the electrical actuator. The chopping control is obtained by changing a duty ratio, which is a ratio of an energizing period to a de-energizing period. When the chopping control is executed, the average level of the current through the electrical actuator is controlled.

The level of the current through the electrical actuator changes greatly according to load variation, temperature variation and supplied voltage variation, etc. Accordingly, an excessive current beyond a rating value might be supplied to the electrical actuator at times. If the excessive current is supplied to the electrical actuator for a long time, the electrical actuator might be damaged. Therefore, such excessive current should be limited.

Japanese Laid-open Patent Publication No. 60-98867 published on June 1, 1985 discloses a current limiter for limiting such excessive current. In this limiter, if the current through the electrical actuator exceeds the predetermined level, the duty ratio is decreased toward a small predetermined value.

However, after the current through the electrical actuator exceeds the predetermined level, pulsations may appear in the current as shown in FIG. 6 in the above described conventional limiter. Such phenomena is generated by a repeated procedure for limiting the excessive current. In other words, after the limiter decreases the current in accordance with the excessive current, if the current is under the predetermined level, the limiter stops operating. Then the current is increased gradually and exceeds the predetermined level so that the limiter decreases the current again.

If a large hysteresis is provided between one level for decreasing the current and another level for stopping limitation, it may be possible to prevent the pulsations from generating. However, the limited current is decreased to a very low level below the predetermined level so that the driving torque is reduced rapidly. If the electrical actuator is utilized for an electric power steering system, the pulsation of the current is represented as a vibration in the auxiliary torque whereby the power steering may feel unpleasant to a driver.

Further, the current through the electrical actuator may be changed in response to varied conditions such as supplied voltage, because the duty ratio for limiting the excessive current is a constant value. In an automobile, a battery is used for the power supply. Accordingly, the output voltage of the battery will be greatly changed. Therefore, if the duty ratio is decreased, an excessive current may be supplied if the output voltage is at a high level. Contrary, if the duty ratio for limiting the current is established at too small a value, an output torque can not be obtained when the output voltage is very low level.

SUMMARY OF THE INVENTION

Accordingly, one of the objects of this invention is to obviate the above conventional drawbacks.

It is also an object of this invention to prevent the generation of a pulsating current in an electrical actuator.

Further, it is an object of this invention to sustain a limited current with almost constant value.

Furthermore, it is an object of this invention to obtain sufficient torque while limiting excessive current.

To achieve the above objects, and in accordance with the principles of the invention as embodied and broadly described herein, a current limiter for an electrical actuator comprises an electronic control means for adjusting a duty ratio when an excessive current is detected. The electronic control means compares the current through the electrical actuator with an upper threshold level and a lower threshold level. If the current exceeds the upper threshold level, the electronic control means decreases the duty ratio gradually as time passes. Further, if the current is below the lower threshold level, the electronic control means increases the duty ratio gradually as time passes. Furthermore, if the current is in a range between the upper threshold level and the lower threshold level, the electronic control means sustains the duty ratio as it is.

BRIEF DESCRIPTION OF THE DRAWINGS

The accompanying drawings, which are incorporated in and constitute a part of the specification, illustrate an embodiment of the invention, and, together with the description, serve to explain the principles of the invention wherein.

DETAILED DESCRIPTION OF THE PREFERRED EMBODIMENT

Reference will now be made in detail to the present preferred embodiment of the invention, an example of which is illustrated in the accompanying drawings.

Figure 2:
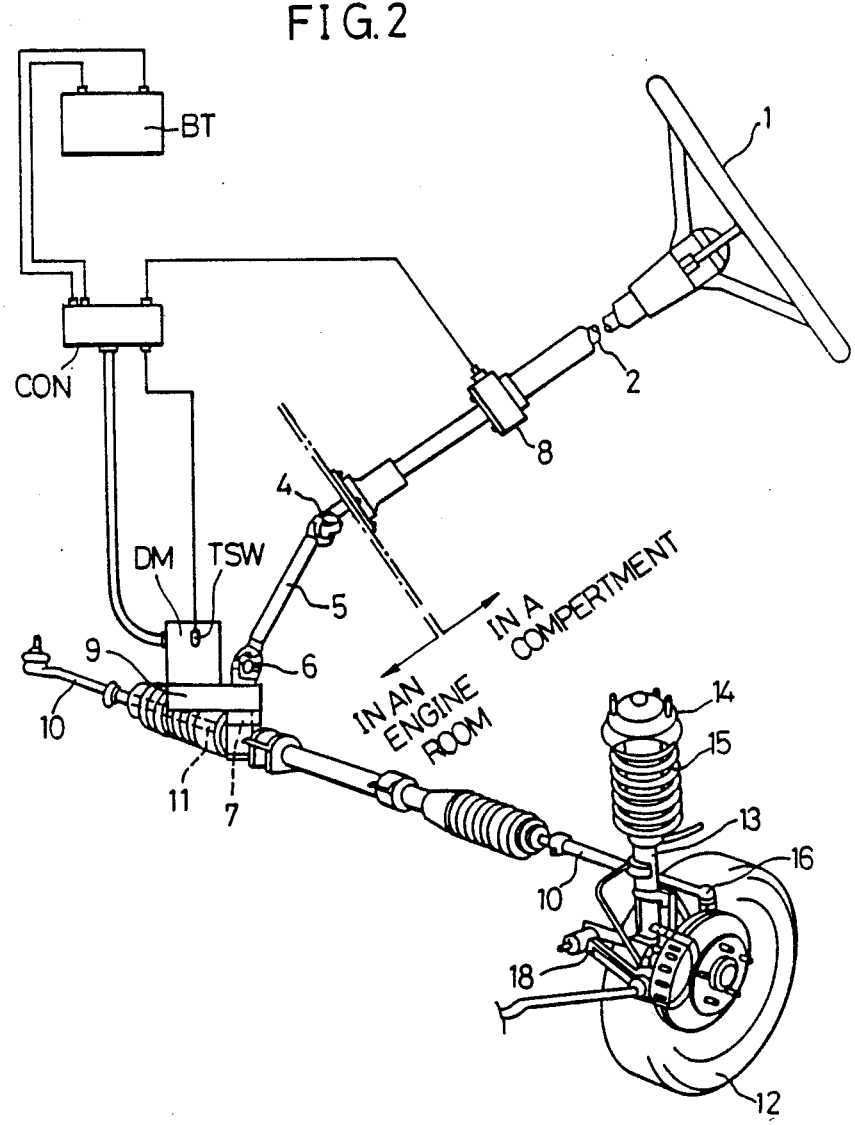
FIG. 2 is a block diagram showing the construction of an automotive electrical power steering system including the present invention.

Referring now to FIG. 2, the construction for an automotive electrical power steering system is explained. A steering wheel (1) is connected to a first steering shaft (2). The first steering shaft (2) is connected to a second steering shaft (5) through a universal joint (4). The second steering shaft (5) is further connected to a third steering shaft (7) through a universal joint (6). The third steering shaft (7) is further connected to a pinion gear (not shown), and this pinion gear is engaged with a rack (11).

A torque sensor (8) including four strain gauges (not shown) is mounted on the first steering shaft (2). The output terminals for the torque sensor (8) are electrically connected to a controller (CON) for controlling the operation of the electrical power steering system. Further, the reduction mechanism (9) is interconnected between the universal joint (6) and the pinion gear fixed to the third steering shaft (7). This reduction mechanism (9) includes a D.C. servomotor (DM) in order to add an auxiliary torque to the third steering shaft (7).

The servomotor (DM) is electrically connected to the controller (CON). Further, in this embodiment, a temperature detecting switch (TSW) is attached to a housing of the DC motor (DM). This temperature switch (TSW) is attached to a housing of the DC motor (DM). This temperature switch (TSW) is also connected electrically to the controller (CON). A battery (BT) is the voltage supply for the electrical power steering system.

The rack (11) is connected to a tierod (10). The tierod (10) is connected to a steering knuckle arm (16) which turns the direction of a wheel (12). A shock absorber (13), a suspension upper support (14), a coil spring (15) and suspension arm (18) constitute a suspension mechanism for supporting the wheel (12).

Figure 3:
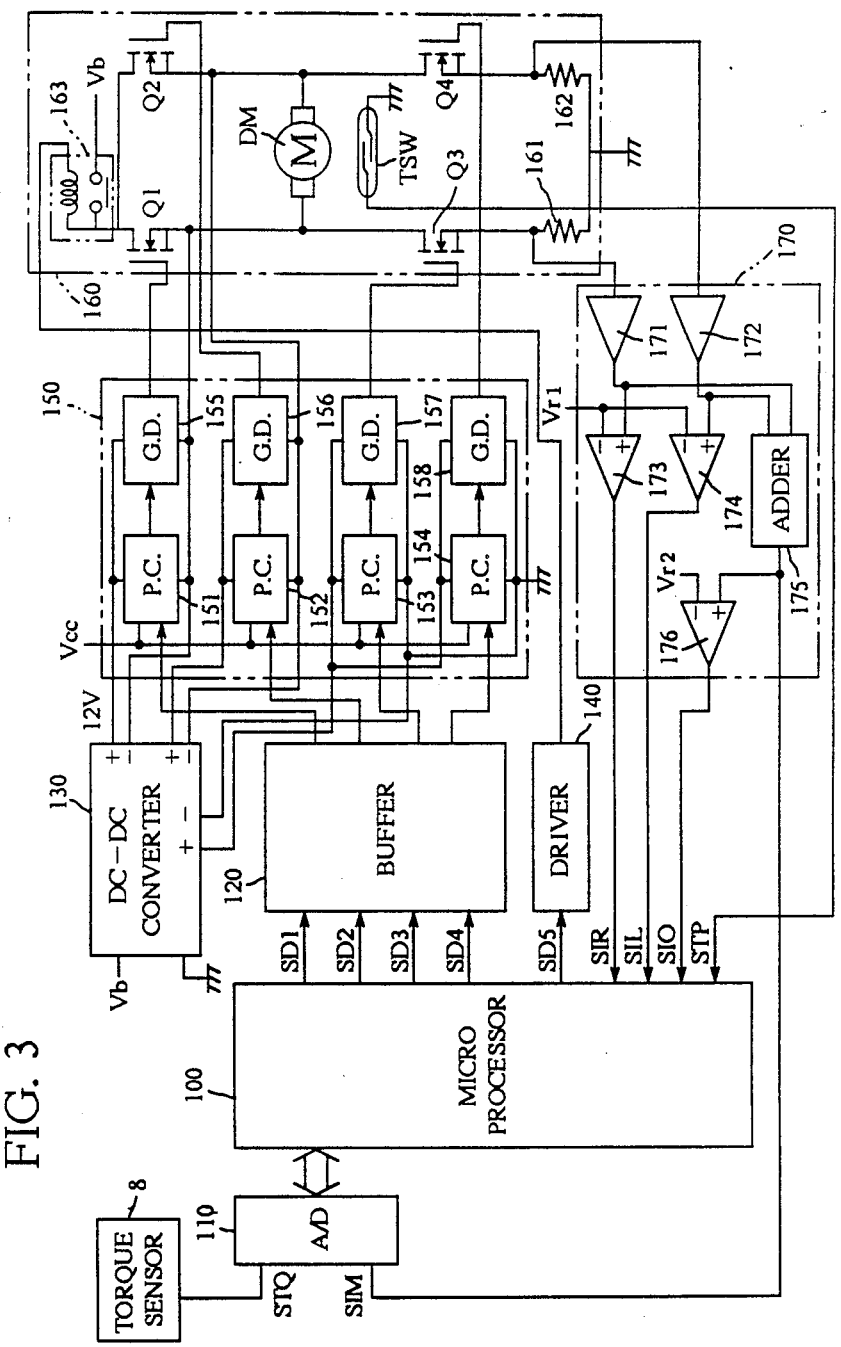
FIG. 3 is an electrical circuit diagram for the device in FIG. 2.

Referring now to FIG. 3, a circuit diagram of the controller (CON) is explained. A microprocessor (100) controls the electrical power steering system entirely, and peripheral circuits are connected to the microprocessor (100). A current is supplied to the servomotor (DM) through the motor driver (160) from the batter (BT). The motor driver (160) includes four switching transistor (Q1, Q2, Q3, Q4). The motor driver (160) establishes the current level and a direction by turning on and off the transistors (Q1, Q2, Q3, Q4). In this embodiment, these transistors (Q1, Q2, Q3, Q4) are power MOS-FETs.

Controlled terminals (i.e., gate terminals) of these transistors (Q1, Q2, Q3, Q4) are connected to the microprocessor (100) through a buffer (120) and an output interface circuit (150). The output interface circuit (150) includes four photo-couplers (151, 152, 153, 154) and four gate drivers (155, 156, 157, 158).

The power for operating each output side of photo-couplers (151, 152, 153, 154) and the gate drivers (155, 156, 157, 158) is supplied by a DC-DC converter (130) which generates the isolated voltage from a regular power supplying line. This DC-DC converter (130) has three lines for generating independent 12(V) D.C. power. The first line is connected to the photo-coupler (151) and the gate driver (155). The second line is connected to the photo-coupler (152) and the gate driver (156). The third line is connected to the photo-couplers (153, 154) and the gate drivers (157, 158). The regular D.C. voltage with 5(V) is supplied to the each input side of the photo-couplers (151, 152, 153, 154).

The transistors (Q1, Q2, Q3, Q4) turn on and off respectively in accordance with the switching operation of the gate drivers (155, 156, 157, 158). When the transistors (Q1, Q4) turn on and the transistors (Q2, Q3) turn off, the current flows through the servomotor (DM) toward a forward direction, and thus, the servomotor (DM) rotates clockwise direction. Contrary, when the transistors (Q1, Q4) turn off and the transistors (Q2, Q3) turn on, the current flows through the servomotor (DM) toward the reverse direction, and thus, the servomotor (DM) rotates in a counterclockwise direction.

Source terminals of the transistors (Q3, Q4) are grounded through the resistors (161, 162). Accordingly, one voltage corresponding to the current through the transistor (Q3) appears between both terminals of resistor (161). The other voltage corresponding to the current through the transistor (Q4) also appears between both terminals of the resistor (162). In other words, the current flowing through the servomotor (DM) in the forward direction is detected by the resistor (162), and the current in the reverse direction is detected by the resistor (161). The voltage corresponding to the current through the servomotor (DM) is applied to a signal processing circuit (170).

The signal processing circuit (170) includes amplifiers (171, 172), analog comparators (173, 174, 176) and an analog adder (175). The analog comparators (173, 174) compare each voltage from the amplifiers (171, 172) with a predetermined threshold level (Vr1). The adder (175) outputs a voltage corresponding to the sum of two output voltages from amplifiers (171, 172). Accordingly, a voltage corresponding to the current through the servomotor (DM) appears on the output terminal of the adder (175) whenever the current flows through the servomotor (DM) in any direction. The comparator (176) compares the voltage from the adder (175) with a predetermined threshold level (Vr2). Signals (SIR, SIL, SIO) from the comparators (173, 174, 176) are applied to three input ports of the microprocessor (100).

Further, a temperature representative signal (STP) from the temperature switch (TSW) is applied to the input port of the microprocessor (100). An analog voltage (SIM) from the adder (175) and an analog voltage (STQ) from the torque sensor (8) are converted into digital signals by an A/D converter (110). The converted signals are applied to the microprocessor (100). The microprocessor (100) controls a relay (163) through the driver (140). Thus, the microprocessor (100) can control the current supplied to the servomotor (DM) selectively.

Figure 4A:
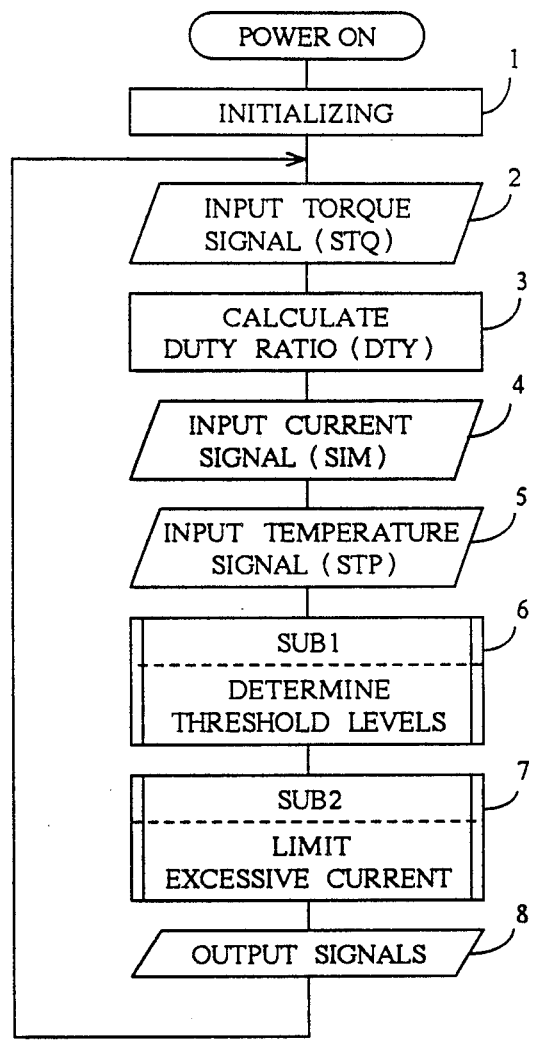
FIGS. 4a, 4b and 4c are flow charts showing a summarized operation of the microprocessor (100) in FIG. 3.

Referring now to FIG. 4a, a summarized operation of a microprocessor (100) is explained. After the power is supplied to the controller (CON), the microprocessor (100) executes an initialization in step (1). In step (1), internal memories are cleared, the output ports are reset, a timer is set and other various parameters are initialized.

Figure 5:
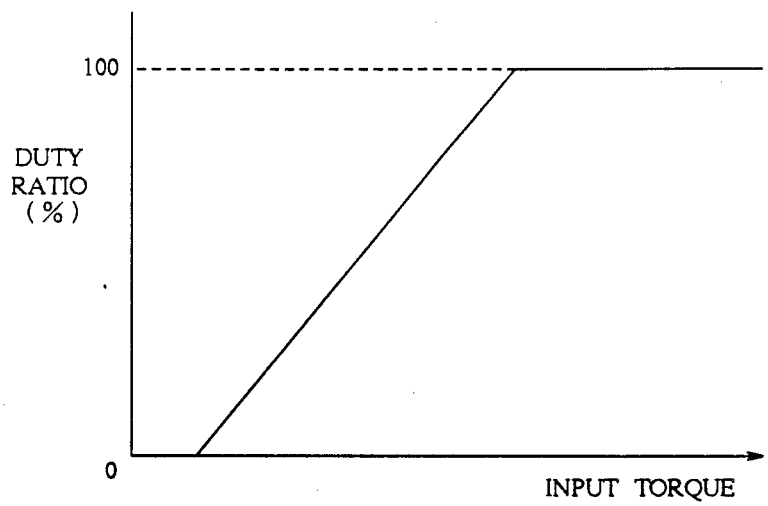
FIG. 5 is a graph showing the correspondence between input torque and a duty ratio for controlling the current through an electrical actuator.
Figure 6:
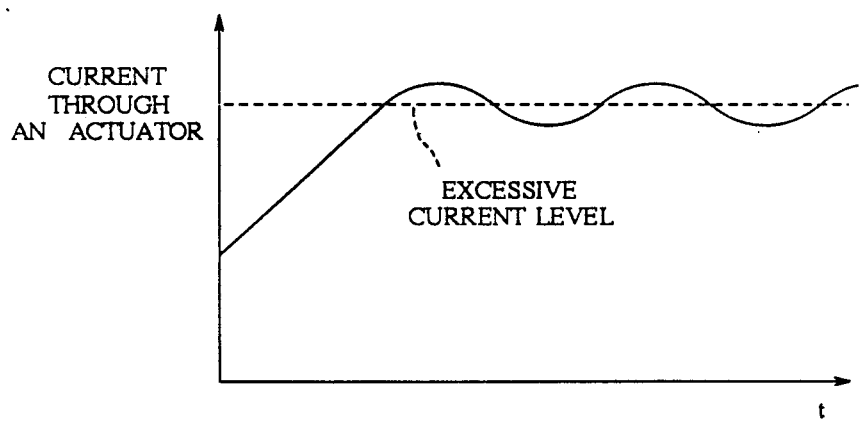
FIG. 6 is a wave-form showing a pulsation current in a conventional current limiter.

In step (2), the microprocessor controls the A/D converter (110) in order to sample the torque signal (STQ). In step (3), the duty ratio is calculated for controlling the current through the servomotor (DM). In this embodiment, a correspondence between the input torque and the duty ratio is shown in FIG. 5, Referring to FIG. 5, the duty ratio is established as 100(%) if the input torque exceeds a predetermined value. In step (4), the microprocessor (110) controls the A/D converter (110) in order to sample the current signal (SIM). In step (5), the temperature representative signal (STP) is input to the microprocessor (100) from the temperature switch (TSW). Further, subroutines (SUB1, SUB2) are executed in steps (6) and (7) and then step (8) is executed.

In step (8), various signals are supplied to respective output ports from the microprocessor (100). For example, when the servomotor (DM) is driven in the clockwise direction, a signal (SD2) and a signal (SD3) are established in higher levels in order to turn off the transistors (Q2, Q3), and a signal (SD1) is established in a lower level in order to turn on the transistor (Q1). Furthermore, the microprocessor (100) outputs a pulse signal (SD4) to the transistor (Q4). In this embodiment, a cycle of the pulse signal (SD4) is established at 13(kHz), and the duty ratio of this pulse signal (SD4) coincides with the aforedescribed duty ratio (DTY).

The duty ratio (DTY) may be changed in step (7). When the pulse signal (SD4) is established at the lower level, the transistor (Q4) turns on. Contrary, when the pulse signal (SD4) is established at the higher level, the transistor (Q4) turns off. Accordingly, the current through the servomotor (DM) flows on and off cyclically with 13(kHz). The relay (163) has been turned on in step (1).

The above described procedure in steps (2, 3, 4, 5, 6, 7, 8) is executed repeatedly.

Figure 4B:
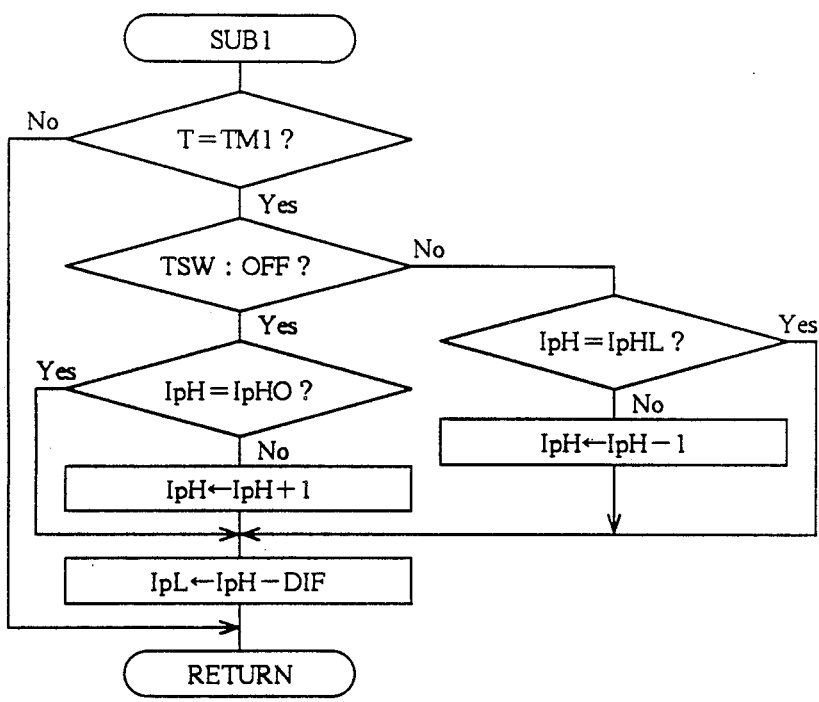

Referring now to FIG. 4b, the subroutine corresponding to step (6) in FIG. 4a is explained. In this embodiment, two independent threshold levels (IpH, IpL) are established in order to control the excessive current through the servomotor (DM). Further, these threshold levels are not constant, but variable in the subroutine (SUB1).

The subroutine (SUB1) substantially executes once within a short period of time (TM1). More concretely, a present time (T), which is represented by the internal timer, is watched in the subroutine (SUB1), and the following procedure is executed whenever the present time (T) shows the time (TM1).

First of all, a condition of the temperature detecting switch (TSW) is checked. If the temperature detecting switch (TSW) is turned off, i.e., the detected temperature is in a normal range, the threshold level (IpH) is compared with a constant value (IpHO). The constant value (IpHO) is equal with an initial value which is established at the threshold level (IpH) in step (1) of FIG. 4a. If the threshold level (IpH) does not coincide with the constant value (IpHO), the threshold level (IpH) is increased by +1, Further, the threshold level (IpL) is established at a value which is subtracted a constant value (DIF) from the threshold level (IpH). Accordingly, the threshold level (IpL) is always established at a level which is below the threshold level (IpH) with the constant value (DIF).

The microprocessor (100) compares the threshold level (IpH) with a constant value (IpHL). The constant value (IpHL) is a minimum value of the threshold level (IpH). If the threshold level (IpH) does not coincide with the threshold level (IpHL), the threshold level (IpH) is decreased by 1. Further, the threshold level (IpL) is established at a value which is subtracted the constant value (DIF) from the threshold level (IpH).

Accordingly, the threshold levels (IpH, IpL) for discriminating the excessive current are decreased by executing the subroutine (SUB1) as time passes, while the temperature detecting switch (DSW) is heated by the servomotor (DM) abnormally. After there temperature of the servomotor (DM) returns to a normal condition, the threshold levels (IpH, IpL) are increased by executing the subroutine (SUB1) as time passes. However, a range where the threshold level (IpH) can be established is limited within a range between the minimum value (IpHL) and the initial value (IpHO).

Figure 4C:
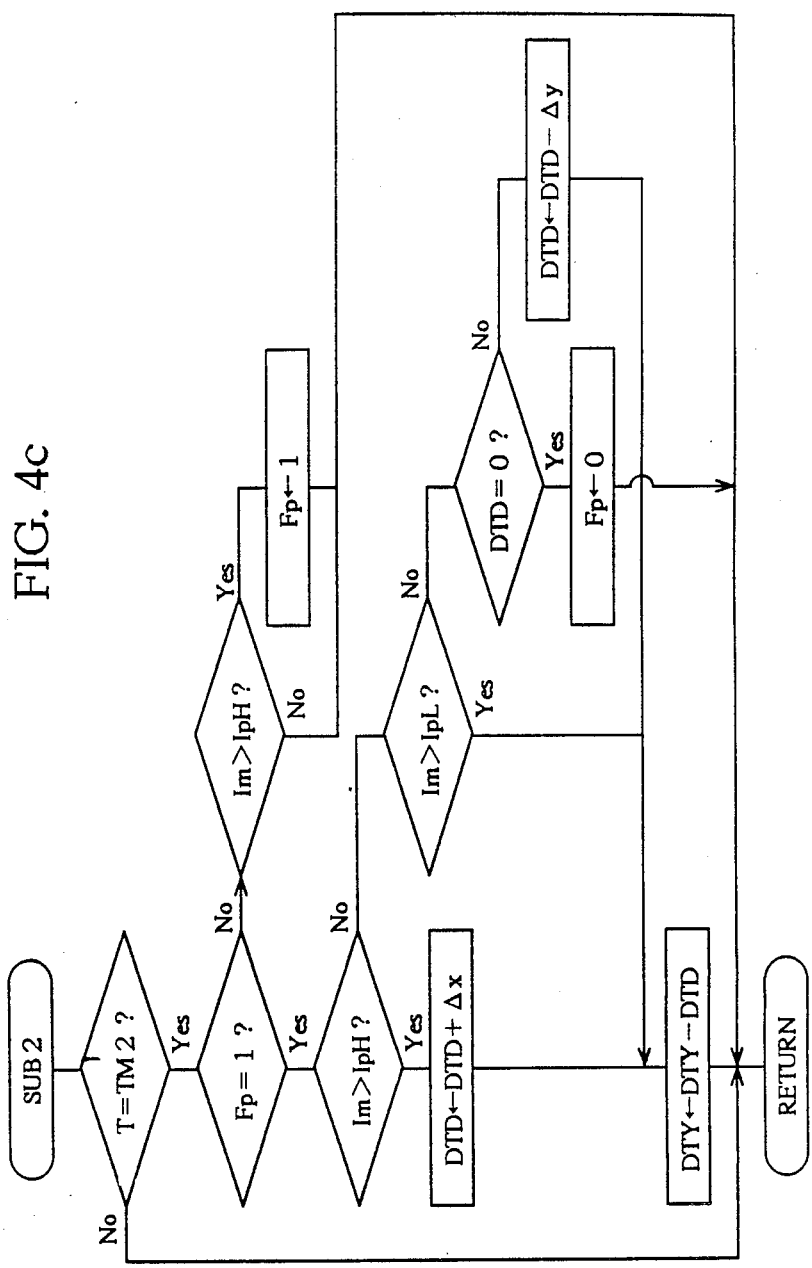

Referring now to FIG. 4c, the subroutine (SUB2) corresponding to the step (7) in the FIG. 4a is explained. The subroutine (SUB2) is substantially executed once within a short period of time (TM2). Accordingly, the present time (T) is watched in the subroutine (SUB2), and the following procedure is executed whenever the present time (T) shows the time (TM2).

First of all, a condition of the flag (Fp) is checked. This flag (Fp) is established in "1" as soon as the excessive current is detected, otherwise the flag (Fp) is established at "0". If the flag (Fp) is not "1", the detected current value (Im) corresponding to the signal (SIM) is compared with the threshold level (IpH). If the current value (Im) is larger than the threshold level (IpH), i.e., if the current through the servomotor (DM) exceeds the upper threshold level (IpH), the flag (Fp) is established at "1", and a procedure for controlling the excessive current is opened. After opening the procedure for controlling the excessive current, the following procedure is executed.

First, the current value (Im) is compared with the threshold level (IpH). If the current value (Im) is larger than the threshold level (IpH), a constant value (x) is added to a reduction register (DTD) for reducing the duty ratio (DTY). Then, the duty ratio (DTY) is revised to a value which is subtracted a constant of the reduction register (DTD) from the duty ratio (DTY).

Further, if the current value (Im) is not larger than the threshold (IpH), the current value (Im) is compared with the threshold level (IpL). Then, if the current value (Im) is larger than the threshold level (IpL), i.e., if the current value (Im) is in the range between the upper and lower threshold levels (IpH, IpL), the reduction register (DTD) is not changed but sustained constantly. Further, if the current value (Im) is below the lower threshold level (IpL), the microprocessor (100) refers to the content of the reduction register (DTD). Then, if the content of the register (DTD) is not zero, the reduction register (DTD) is revised in a value which is subtracted a constant value (y) from the reduction register (DTD). After that, the duty ratio (DTY) is revised to a value which is subtracted a content of the reduction resister (DTD) from the duty ratio (DTY).

Figure 1:
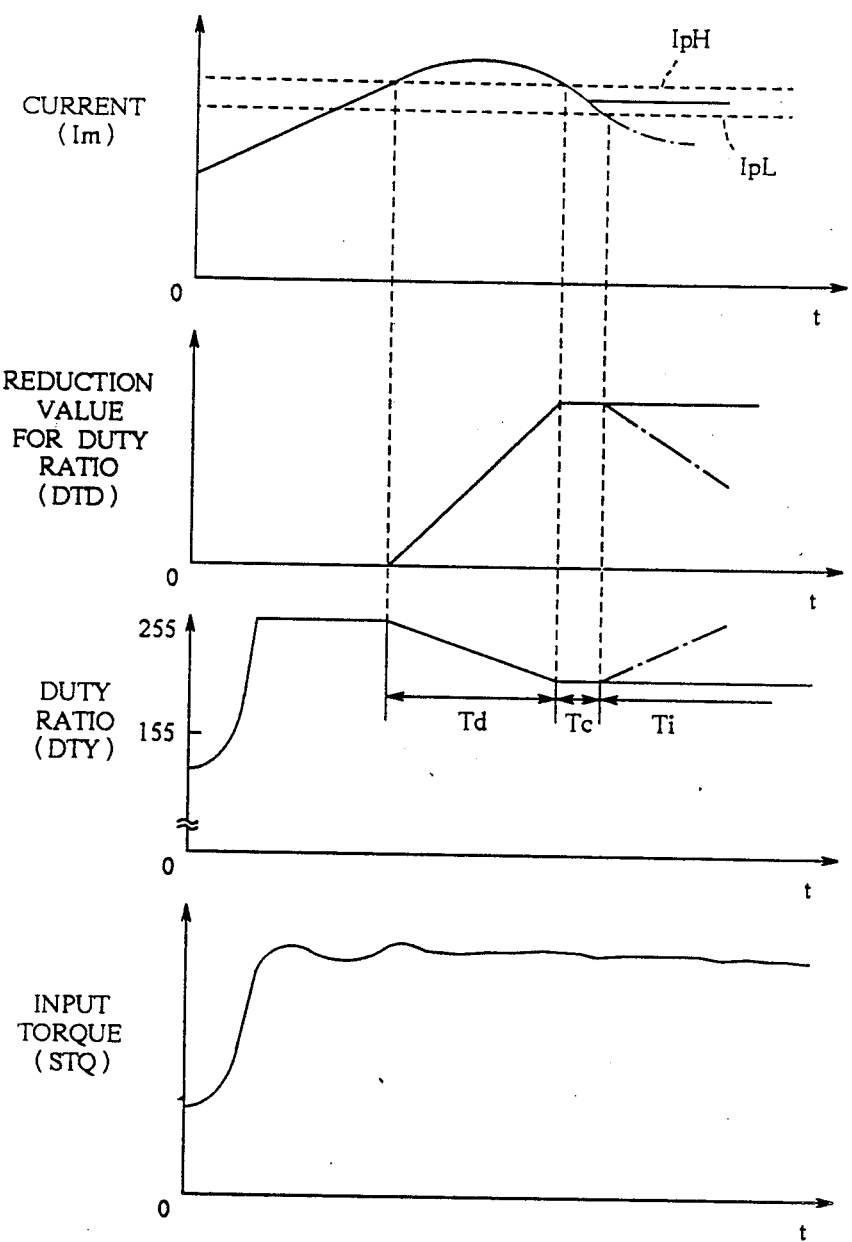
FIG. 1 is a timing chart showing an operation for limiting the excessive current of the device in FIG. 3.

Accordingly, the following procedure is executed in this embodiment. Referring now to FIG. 1, the procedure of this embodiment is explained.

In this embodiment, the duty ratio (DTY) and the reduction register (DTD) are represented by an 8-bit code. Therefore, each maximum value of the duty ratio (DTY) and the reduction register (DTD) are 255, and each minimum value of them are zero. At the beginning, the content of the duty ratio (DTY) becomes a value which is calculated at step (3) in FIG. 4, because the content of the reduction register (DTD) is zero. Therefore, the duty ratio (DTY) corresponds to the input torque at the beginning.

After the duty ratio (DTY) is increased due to the increased input torque, the current (Im) through the servomotor (DM) is increased in response to the increased load of the servomotor (DM). When the current (Im) exceeds the threshold level (IpH), the content of the reduction register (DTD) is increased with the constant value (x) per the unit period (TM2) as time passes. Accordingly, the average current through the servomotor (DM) is decreased gradually as time passes in the area within a period (Td), because the duty ratio (DTY) is decreased gradually.

When the current (Im) goes into the range between the threshold levels (IpH, IpL) in response to decreasing the current (Im), i.e., when the current (Im) goes into the area (Tc), the content of the reduction register (DTD) is sustained constantly, then the duty ratio (DTY) is sustained constantly. Of course, the duty ratio (DTY) can be changed within the area (Tc) in response to the result which is calculated in step (3) in FIG. 4a.

In general, a variation of the current (Im) almost disappears within the area (Tc), and thus, the current (Im) is sustained between the threshold levels (IpH, IpL) until the input torque is reduced. When the input torque is reduced or when the current (Im) is sustained between the threshold levels (IpH, IpL) until the input torque is reduced. When the input torque is reduced or when the current (Im) is below the threshold level (IpL) without reducing the input torque, the content of the reduction register (DTD) is reduced gradually with a constant value (y) per the unit period (TM2) as time passes. Accordingly, the duty ratio (DTY) is increased gradually in the area (Ti) as time passes. Thus, the current (Im) into the range between the threshold levels (IpH, IpL).

After the content of the reduction register (DTD) becomes zero, the procedure for controlling the excessive current is closed until the current (Im) exceeds the threshold level (IpH) again. Then the duty ratio (DTY) is sustained constantly with a value calculated in step (3) in FIG. 4a.

As mentioned above, in this embodiment, when the excessive current is detected, the control, which decreases the duty ratio (DTY) as time passes, is executed until the current through the servomotor (DM) goes into a certain range. Therefore, the excessive current through the servomotor (DM) is limited reliably against a large voltage variation from the battery (BT) and a large load variation to the servomotor (DM).

Further, in this embodiment, if at least one of the threshold levels (IpH, IpL) is changed in response to the temperature representative signal (STP), an overheating of the servomotor (DM) is avoided effectively.

We claim:

1. A current limiter for an electrical actuator comprising:
   switching means for controlling a current supplied to the electrical actuator selectivity;
   detecting means for detecting a level of current flowing through the electrical actuator; and
   electronic controlling means for adjusting a duty ratio of the switching means in order to limit excessive current;
   wherein the electronic controlling means further comprises
   comparing means for comparing the current flowing through the electrical actuator with an upper threshold level and a lower threshold level;
   decreasing means for decreasing the duty ratio of the switching means gradually if the detected current flowing through the electrical actuator exceeds the upper threshold level;
   increasing means for increasing the duty ratio of the switching means gradually if the detected current flowing through the electrical actuator is below the lower threshold level; and
   sustaining means for sustaining the duty ratio of the switching means if the current flowing through the electrical actuator is in a range between the upper threshold level and the lower threshold level.

2. The limiter as set forth in claim 1, further comprising:
   temperature detecting means for detecting a temperature near the electrical actuator, and
   wherein the electronic controlling means is operable for changing at least one of the upper and lower threshold levels in response to a temperature detected by the temperature detecting means.

3. The limited as set forth in claim 2, wherein the electronic controlling means further comprises:
   subtracting means for decreasing the upper and lower threshold levels gradually if the temperature detected by the temperature detecting means exceeds a predetermined level; and
   adding means for increasing the upper and lower threshold levels gradually if the temperature detected by the temperature detecting means is below the predetermined level.

4. The limiter as set forth in claim 1, wherein a difference between the upper threshold level and the lower threshold level is sustained constantly.

* * * * *